US008850668B2

(12) United States Patent
Chen

(10) Patent No.: US 8,850,668 B2
(45) Date of Patent: Oct. 7, 2014

(54) CURTAIN BEAD CHAIN FIXING DEVICE

(75) Inventor: Ju-Huai Chen, Changhua County (TW)

(73) Assignee: My Home Global Company, Changhua County (TW)

( * ) Notice: Subject to any disclaimer, the term of this patent is extended or adjusted under 35 U.S.C. 154(b) by 1287 days.

(21) Appl. No.: 12/611,782

(22) Filed: Nov. 3, 2009

(65) Prior Publication Data

US 2011/0035908 A1 Feb. 17, 2011

(30) Foreign Application Priority Data

Aug. 13, 2009 (TW) ................................ 98214942 U

(51) Int. Cl.

*E06B 9/322* (2006.01)
*A47H 1/00* (2006.01)
*F16H 55/36* (2006.01)
*E06B 9/324* (2006.01)
*E06B 9/262* (2006.01)

(52) U.S. Cl.

CPC ................. *E06B 9/262* (2013.01); *E06B 9/324* (2013.01); *E06B 2009/2622* (2013.01)
USPC .................. 24/116 A; 160/178.2; 160/177 R; 160/321

(58) Field of Classification Search

USPC ........................................................ 24/116 A
See application file for complete search history.

(56) References Cited

U.S. PATENT DOCUMENTS 2,176,709 A * 10/1939 Dym ........................ 128/207.11
2,676,373 A * 4/1954 Meeker ............................ 24/3.6
3,786,595 A * 1/1974 Croce .......................... 43/44.87
3,867,905 A * 2/1975 Vail, Jr. ......................... 119/793
7,174,859 B2 * 2/2007 Lee .............................. 119/863
8,499,814 B2 * 8/2013 Ng ............................ 160/173 R

* cited by examiner

*Primary Examiner* — Jack W Lavinder
(74) *Attorney, Agent, or Firm* — Muncy, Geissler, Olds & Lowe, P.C.

(57) ABSTRACT

A curtain bead chain fixing device includes a bead chain guide way through which a bead chain as a pull cord for controlling a curtain is extended and thereby becomes connected to the fixing device, and an elastically movable interfering element being normally pushed into the bead chain guide way to interfere with the free movement of the bead chain in and along the bead chain guide way. When the fixing device is adequately mounted to a wall surface according to specified installation procedures, the interfering element is forced out of the bead chain guide way to release the bead chain therefrom. Therefore, a user of the curtain is urged and guided to adequately mount the fixing device to hold the bead chain in place, and undesired accidents caused by a swinging bead chain can be avoided.

4 Claims, 8 Drawing Sheets

CURTAIN BEAD CHAIN FIXING DEVICE

CROSS-REFERENCE TO RELATED APPLICATIONS

This non-provisional application claims priority under 35 U.S.C. §119(a) on Patent Application No(s). 098214942 filed in Taiwan, R.O.C. on 13 Aug. 2009, the entire contents of which are hereby incorporated by reference.

FIELD OF THE INVENTION

The present invention relates to a curtain pull cord fixing device, and more particularly to a fixing device with which a bead chain serving as a pull cord for controlling a curtain can be held in place to avoid undesired accidents caused by a swinging bead chain.

BACKGROUND OF THE INVENTION

Generally, a pull cord for controlling a curtain is not held in place and tends to swing, particularly when the air in a room flows, and someone passing by the curtain is possibly dangerously tripped over the swinging pull cord and falls.

To avoid the pull cord from freely swinging, a fixing device is delivered along with the curtain and the pull cord sold to a user. As shown in FIG. 1, a curtain 110 is controlled with a pull cord 120, and the pull cord 120 can be held in place using a fixing device 130 delivered along with the curtain and the pull cord. The fixing device 130 is provided with a mounting hole 132, so that the fixing device can be mounted to a wall surface or other suitable stationary article by extending a fastening element through the mounting hole 132 into the wall surface. With the fixing device 130 mounted on the wall surface at a proper position, the pull cord 120 can be held in a substantially straight state without swinging freely and can still be pulled normally to move as a loop to lift or lower the curtain 110.

The fixing device 130 delivered along with the curtain 110 and the pull cord 120 tends to be ignored by the user. Most users even do not want to mount the fixing device 130. Therefore, the conventional fixing device 130 is almost useless in such a condition.

SUMMARY OF THE INVENTION

A primary object of the present invention is to provide a curtain bead chain fixing device, which urges a user to actively install the fixing device to achieve the purpose of holding a bead chain of a curtain in place to avoid undesired accidents caused by a swinging bead chain.

To achieve the above and other objects, the curtain bead chain fixing device according to an embodiment of the present invention includes a bead chain guide way extended through the fixing device for a curtain bead chain to extend therethrough and become connected to the fixing device; and a first elastically movable interfering element provided with a first fixing hole. The first interfering element is arranged to one side of the bead chain guide way to normally elastically extend into the bead chain guide way to interfere with the free movement of the bead chain in and along the bead chain guide way. When the fixing device is adequately mounted to a wall surface with a fastening element extended through the first fixing hole, the first interfering element is forced out of the bead chain guide way.

The fixing device can further include a second elastically movable interfering element provided with a second fixing hole. The second interfering element is arranged to another opposing side of the bead chain guide way to normally elastically extend into the bead chain guide way to interfere with the free movement of the bead chain in and along the bead chain guide way. When the fixing device is adequately mounted to a wall surface with a fastening element extended through the second fixing hole, the second interfering element is forced out of the bead chain guide way.

Preferably, the first and the second interfering element are aligned with each other.

To achieve the above and other objects, the curtain bead chain fixing device according to another embodiment of the present invention includes a first fixing zone, a second fixing zone, and a bead chain guide way formed form an upper guide way and a lower guide way. The fixing device further includes an upper case, on which the upper guide way is provided to divide the upper case into the first fixing zone and the second fixing zone, the upper case being provided in the first fixing zone with a first upper fixing hole, in the second fixing zone with a second upper fixing hole, and between the upper guide way and the first fixing zone of the upper case with an upper pressing element passage; a lower case, on which the lower guide way is provided corresponding to the upper guide way to divide the lower case into the first fixing zone and the second fixing zone, the lower case being provided in the first fixing zone with a first lower fixing hole, in the second fixing zone with a second lower fixing hole; between the lower guide way and the first fixing zone of the lower case with a lower pressing element passage; between the lower guide way and the second fixing zone of the lower case with an lower extending element passage, and in the second fixing portion with a flexible and obliquely extended lower extending element, which has a narrowed protruded front end normally extending through the lower extending element passage into the bead chain guide way; and a pressing element being arranged in the first fixing zone and pushed by an elastic element, of which an end is pressed against a side wall of the first fixing zone and another opposing end is pressed against a rear end of the pressing element, such that a narrowed protruded front end of the pressing element is normally pushed by the elastic element into the bead chain guide way, and the pressing element being provided with a middle fixing hole. The narrowed protruded front ends of the pressing element and the lower extending element extended into the bead chain guide way interfere with a bead chain extended through the bead chain guide way, preventing the bead chain from freely moving in and along the bead chain guide way. And, the first upper fixing hole is corresponding to and aligned with the first lower fixing hole while offsetting from the middle fixing hole. Therefore, when the fixing device is adequately mounted to a wall surface with a fastening element extended through the first upper and lower fixing holes and the middle fixing hole into the wall surface, the narrowed protruded front end of the lower extending element is forced out of the bead chain guide way. The second upper fixing hole is aligned with and larger than the second lower fixing hole. When the fixing device is adequately mounted to a wall surface with a fastening element extended through the second upper and lower fixing holes into the wall surface, the narrowed protruded front end of the pressing element is forced out of the bead chain guide way.

Preferably, the pressing element and the lower extending element are aligned with each other.

Since the fixing device of the present invention is directly connected to the bead chain in the manufacturing factory, and the bead chain can be operated normally only when the fixing device has been adequately mounted on a wall surface to hold the bead chain in place without swinging freely, the user is urged to adequately mount the fixing device according to the specified installation procedures to release the bead chain from the interference by the interfering elements in the fixing device and allow the bead chain to operate normally. In other words, the present invention drives the user to adequately mount the fixing device to hold the bead chain in place, in order to avoid the fixing device from locking to and moving along with the pulled bead chain to produce an unpleasant scene in a room, and to effectively avoid undesired accidents caused by a freely swinging bead chain, such as tripping over the swinging bead chain.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
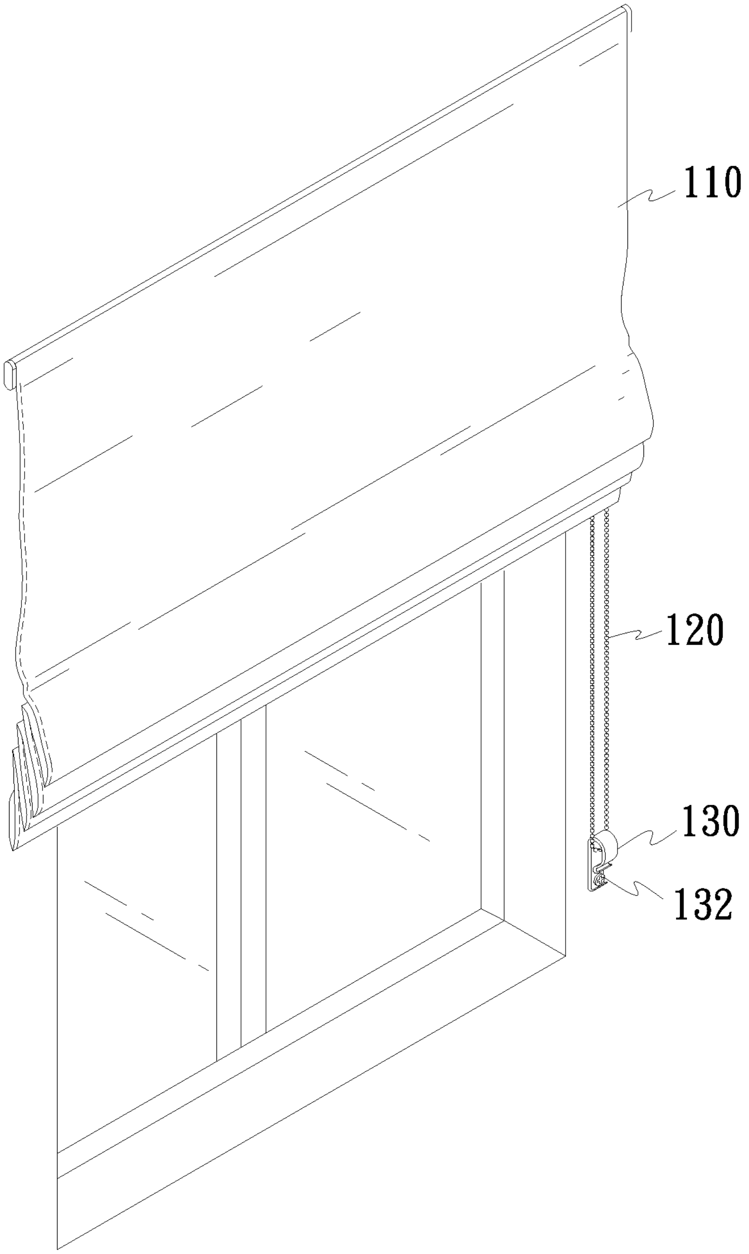
(PRIOR ART) Fig. 1
FIG. 1 is a perspective view showing a conventional curtain bead chain fixing device.
Figure 2:
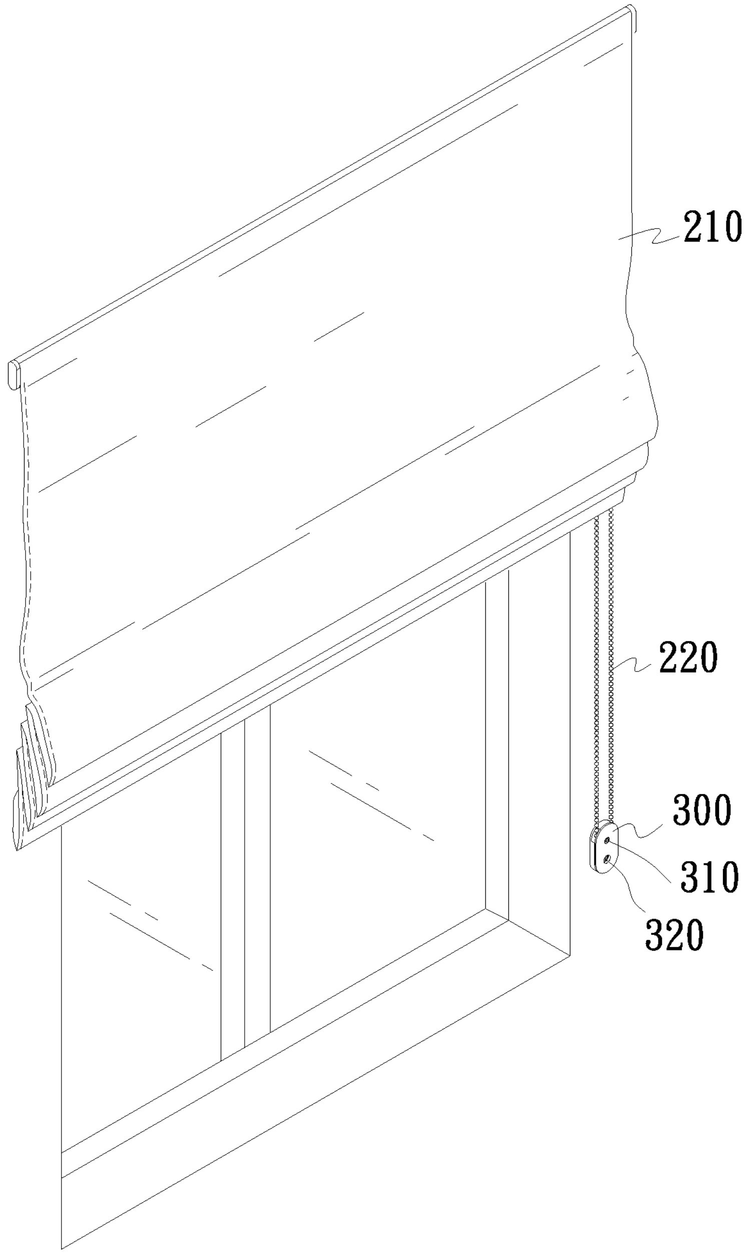
FIG. 2 is a perspective view showing a curtain bead chain fixing device according to the present invention having been adequately mounted to a wall surface to hold a bead chain in place while allowing the bead chain to operate normally.

Please refer to FIG. 2, which shows a curtain bead chain fixing device 300 according to the present invention having been adequately mounted to a wall surface to hold a curtain bead chain 220 in place for operation normally. For the purpose of conciseness, the present invention is also briefly referred to as the "fixing device" herein. As shown, a curtain 210 is controlled via a pull cord in the form of a bead chain 220 to lift or lower to a desired height, and the bead chain 220 is held in place via the fixing device 300 that is mounted to a wall surface or other suitable stationary article using fastening elements, such as screws, nails, steel nails, etc. As shown, the fixing device 300 is preferably provided with two mounting holes 310, 320, via which two fastening elements are extended into the wall surface to fixedly mount the fixing device 300 to the wall surface.

Figure 3:
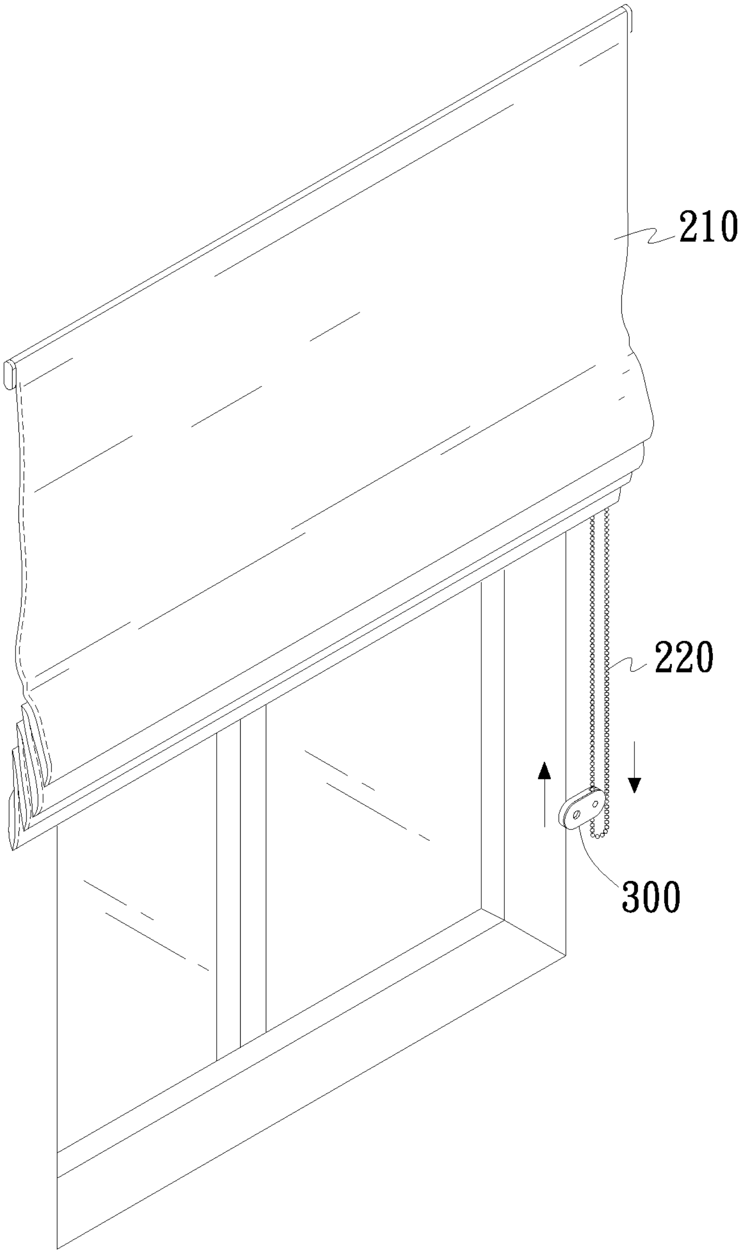
FIG. 3 shows the curtain bead chain fixing device according to the present invention without being adequately mounted to a wall surface will move along with the bead chain when the latter is pulled.

The fixing device 300 according to the present invention is so designed that it interferes with the bead chain 220 extended therethrough when the fixing device 300 is not adequately mounted to the wall surface to hold the bead chain 220 in place. That is, before the fixing device 300 is adequately mounted to the wall surface, the bead chain 220 extended through the fixing device 300 is not allowed to freely move in and along a bead chain guide way (330, see FIGS. 4A and 4B) defined in the fixing device 300. In other words, before the fixing device 300 is adequately mounted to the wall surface according to specified mounting procedures, the fixing device 300 will interfere with or lock to and accordingly move along with the bead chain 220 when the latter is pulled, as shown in FIG. 3. On the other hand, when the fixing device 300 has been adequately mounted to the wall surface to hold the bead chain 220 in place, it no longer interferes with or locks to the bead chain 220 extended therethrough but allows the bead chain 220 pulled by a user to freely move in and along the bead chain guide way 330 in the fixing device 300.

To achieve the above-described functions of interfering with and releasing the bead chain 220, the fixing device 300 is internally provided with at least an elastically movable interfering element, which keeps interfering with the bead chain 220 until the fixing device 300 is adequately mounted to a wall surface to hold the bead chain 220 in place. Since the bead chain 220 is formed from a plurality of beads being sequentially arranged on a string, there is a space existing between any two adjacent beads, and it is possible for an elastically movable interfering element to extend into any one of such spaces to thereby interfere with the bead chain 220 extended through the fixing device 300, causing the fixing device 300 to move along with the bead chain 220 when the latter is pulled. In other words, the bead chain 220 is not able to freely move through the bead chain guide way 330 in the fixing device 300 under the interfered state.

On the other hand, when the elastically movable interfering element is forced out of the bead chain guide way 330 and accordingly the space between two adjacent beads through adequate mounting of the fixing device 300 to a wall surface, the bead chain 220 is released from the interference by the interfering element and allowed to freely move through the fixing device 300 when being pulled.

Figure 4A:
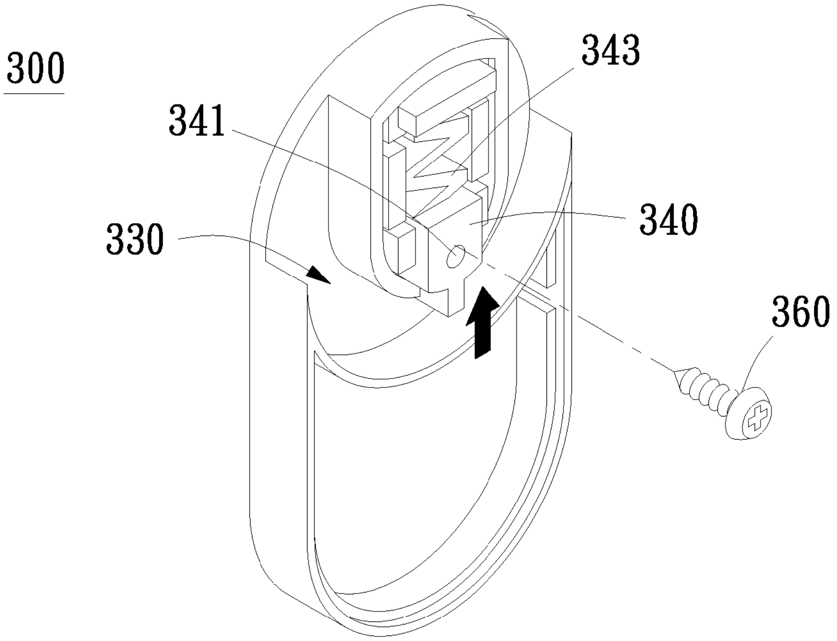
FIG. 4A is a cutaway view showing a first elastically movable interfering element in the curtain bead chain fixing device according to a first embodiment of the present invention.

Please refer to FIG. 4A that is a cutaway view of a fixing device 300 according to a first embodiment of the present invention, in which a first type of elastically movable interfering element is adopted. In the first embodiment, the fixing device 300 internally defines a bead chain guide way 330 that extends across the fixing device 300, so that a bead chain 220 (not shown in FIG. 4A) can be extended through the fixing device 300 via the bead chain guide way 330 and becomes connected to the fixing device 300, as can be seen from FIG. 2. The fixing device 300 is internally provided with a first interfering element 340 that can be elastically moved by an elastic element 343 located at a rear end of the first interfering element 340. The elastic element 343 has an end pressed against an inner wall of the fixing device 300 and another opposing end pressed against the rear end of the first interfering element 340, so as to normally elastically push the first interfering element 340 for a front end thereof to normally extend into the bead chain guide way 330 and locate in the space existing between two adjacent beads. With the first interfering element 340 located at such a position in the fixing device 300, the bead chain 220 is interfered by the first interfering element 340 from freely moving in and along the bead chain guide way 330. The elastic element 343 can be a piece of soft plastics, a spring, or other functionally equivalent element. The first interfering element 340 is provided with a first fixing hole 341, which extends through the first interfering element 340 in a thickness direction thereof, and a fastening element 360 is allowed to extend into the first fixing hole 341. It is noted, however, the first fixing hole 341 is vertically offset from an extending path of the fastening element 360 defined by a mounting hole (not shown in FIG. 4A) formed on a wall of the fixing device 300. Therefore, the first interfering element 340 can be moved out of the bead chain guide way 330 only when the fastening element 360 has been adequately extended through the first fixing hole 341 on the elastically movable first interfering element 340 and the mounting hole on the wall of the fixing device 300 to align the two holes with each other. At this point, since the first interfering element 340 has been moved out of the bead chain guide way 330 and the front end of the first interfering element 340 no longer locates between two adjacent beads, the bead chain 220 is no longer interfered by the first interfering element 340 and can freely move in and along the guide way 330.

Figure 4B:
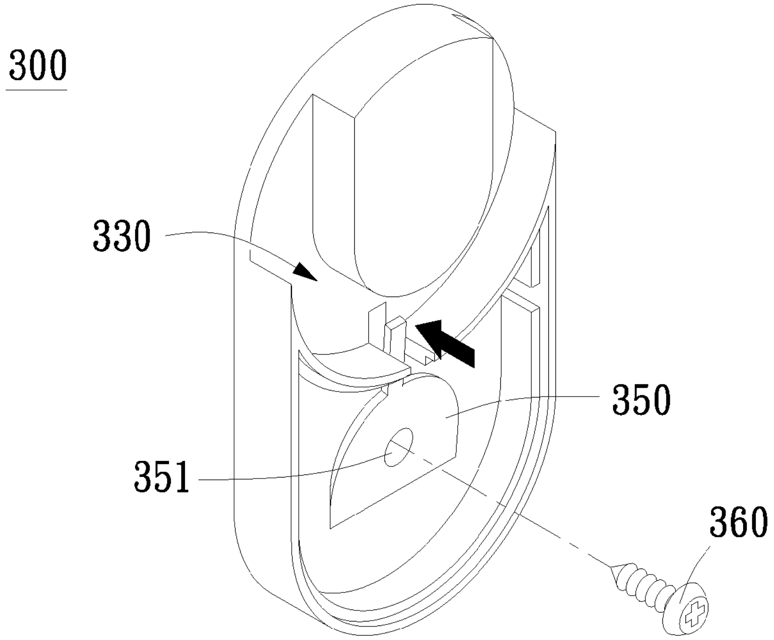
FIG. 4B is a cutaway view showing a second elastically movable interfering element in the curtain bead chain fixing device according to the first embodiment of the present invention.

FIG. 4B is another cutaway view of the fixing device 300 according to the first embodiment of the present invention, in which a second type of elastically movable interfering element is adopted. The second type of elastically movable interfering element is a second interfering element 350 arranged to one side of the bead chain guide way 330, and formed on a wall of the fixing device 300 by cutting the wall, such that the second interfering element 350 has a rear edge still connected to the bottom wall to provide a degree of flexibility, allowing a front end of the second interfering element 350 to elastically and obliquely extend into the bead chain guide way 330. The front end of the second interfering element 350 extended into the bead chain guide way 330 is located in a space between two adjacent beads to interfere with the bead chain 220, preventing the latter from freely moving in and along the bead chain guide way 330. The second interfering element 350 is provided with a second fixing hole 351, which extends through the second interfering element 350 in a thickness direction thereof, and a fastening element 360 is allowed to extend through the second fixing hole 341 to thereby mount the fixing device 300 on a wall surface or other stationary article. When the fixing device 300 has been used and adequately installed by extending the fastening element 360 through the second fixing hole 351 into the wall surface, the second interfering element 350 is held down by the fastening element 360 to move the front end thereof out of the bead chain guide way 330. At this point, the bead chain 220 is no longer interfered by the front end of the second interfering element 350 and can therefore freely move in and along the bead chain guide way 330 when being pulled.

In the above-described first embodiment, both of the first and the second interfering element 340, 350 can function to interfere with the free movement of the bead chain in the bead chain guide way 330. While only one first or second interfering element 340, 350 is provided to one side of the bead chain guide way 330 in the fixing device 300 of the illustrated first embodiment, it is also feasible to provide the first or the second interfering element 340, 350 to each of two opposite sides of the bead chain guide way 330 to provide even better interfering effect. Preferably, the first or the two second interfering elements 340, 350 provided to two opposite sides of the bead chain guide way 330 are aligned with each other, so as to ensure effective interference with the space between the adjacent beads of the bead chain to more stably prevent the bead chain from moving. When two interfering elements are provided in the fixing device 300, they can be of the same type, such as two first interfering elements 340 or two second interfering elements 350, or can be of two different types, i.e. one first and one second interfering element 340, 350.

Figure 5A:
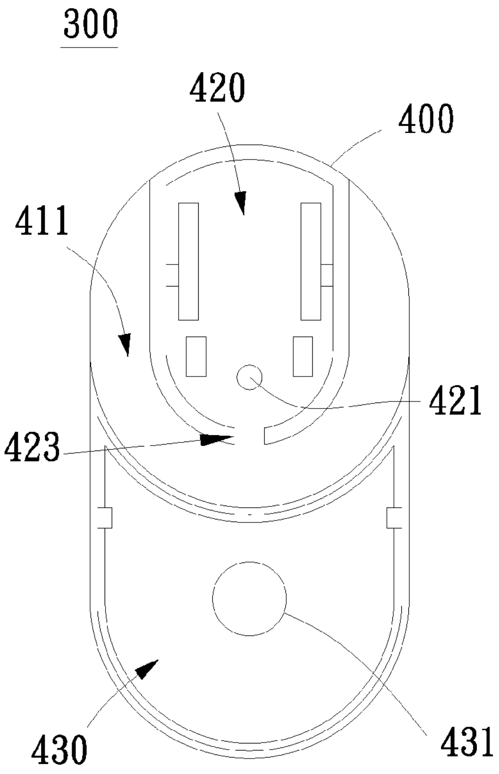
FIG. 5A is a plan view showing an inner face of an upper case of a curtain bead chain fixing device according to a second embodiment of the present invention.
Figure 5B:
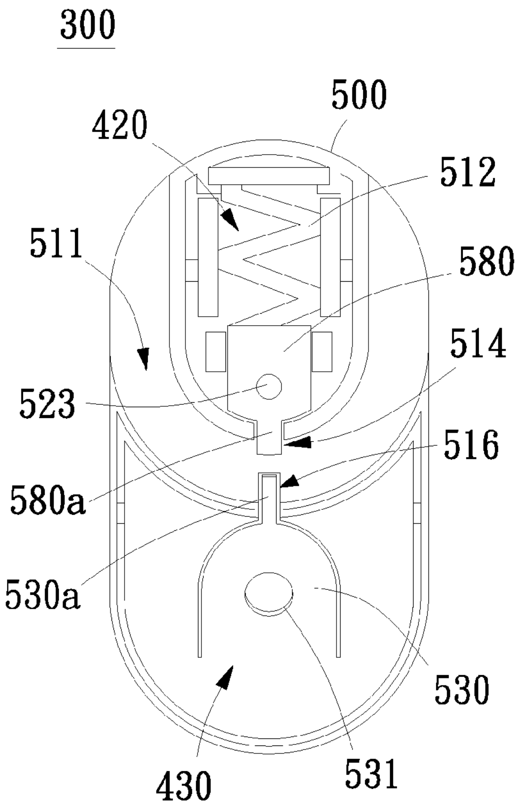
FIG. 5B is a plan view showing an inner face of a lower case of the curtain bead chain fixing device according to the second embodiment of the present invention.
Figure 5C:
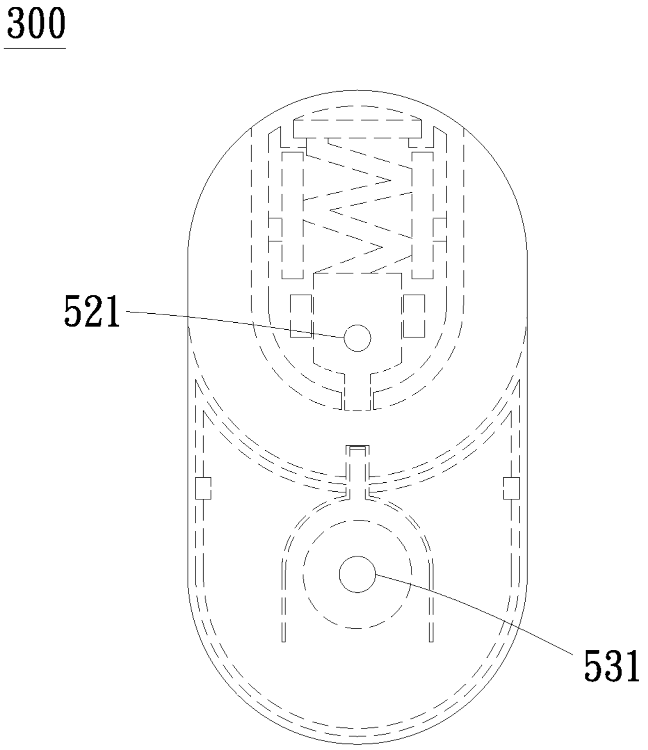
FIG. 5C is a bottom view of the curtain bead chain fixing device according to the second embodiment of the present invention in an assembled state.

Please refer to FIGS. 5A, 5B and 5C at the same time, in which a fixing device 300 according to a second embodiment of the present invention is shown. FIG. 5A is a plan view showing an inner face of an upper case 400 of the fixing device 300; FIG. 5B is a plan view showing an inner face of a lower case 500 of the fixing device 300; and FIG. 5C is a bottom view of the fixing device 300 in an assembled state with the phantom lines indicating different components inside the fixing device 300. In the fixing device 300 of the second embodiment, two elements separately functioning like the above-described first and second interfering elements are provided at the same time to achieve the purpose of interfering with the free movement of a bead chain in and along a bead chain guide way provided in the fixing device 300. As shown, the fixing device 300 in the second embodiment includes an upper case 400, a lower case 500, and a pressing element 580. The upper case 400 and the lower case 500 can be assembled to each other to provide a complete case for the fixing device 300 and enclose the pressing element 580 in the case. The fixing device 300 is internally provided with a bead chain guide way extending across the fixing device 300 for the bead chain to extended therethrough and therefore becomes connected to the fixing device 300.

The upper case 400 is provided on an inner face with an upper guide way 411, which divides the upper case 400 into a first fixing zone 420 and a second fixing zone 430 located at two opposite sides of the upper guide way 411. In the first fixing zone 420 on the upper case 400, there is provided a first upper fixing hole 421. In the second fixing zone 430 on the upper case 400, there is provided a second upper fixing hole 431. An upper pressing element passage 423 is formed between the upper guide way 411 and the first fixing zone 420.

The lower case 500 is provided on an inner face with a lower guide way 511 corresponding to the upper guide way 411, so that the upper and the lower guide way 411, 511 together form the bead chain guide way in the fixing device 300. Similarly, the lower guide way 511 divides the lower case 500 into a first fixing zone 420 and a second fixing zone 430 located at two opposite sides of the lower guide way 511. In the first fixing zone 420 on the lower case 500, there is provided a first lower fixing hole 521 (see FIG. 5C). In the second fixing zone 430 on the lower case 500, there is provided a second lower fixing hole 531. A lower pressing element passage 514 is formed between the lower guide way 511 and the first fixing zone 420 on the lower case 500; and a lower extending element passage 516 is formed between the lower guide way 511 and the second fixing zone 430 on the lower case 500. The lower case 500 is further provided in the second fixing zone 430 with a flexible lower extending element 530 that obliquely extends from the lower case 500 into the lower guide way 511. More specifically, the lower extending element 530 has a narrowed protruded front end 530_a_ being extended through the lower extending element passage 516 into the lower guide way 511, i.e. the bead chain guide way in the fixing device 300.

The pressing element 580 is located in the first fixing zone 420, and includes a middle fixing hole 523. An elastic element 512 is disposed between the pressing element 580 and a side wall of the first fixing zone 420, such that an end of the elastic element 512 is pressed against the side wall of the first fixing zone 420 and another opposing end of the elastic element 512 is pressed against a rear end of the pressing element 580, such that the pressing element 580 is pushed by the elastic element 512 for a narrowed protruded front end 580*a* of the pressing element 580 to normally extend through the lower pressing element passage 514 into the lower guide way 511, i.e. the bead chain guide way in the fixing device 300.

Thus, the narrowed protruded front ends 580*a* and 530*a* together hold the bead chain immovable in the bead chain guide way of the fixing device 300. The first upper fixing hole 421 and the first lower fixing hole 521 are aligned with each other, while the middle fixing hole 523 is offset from the first upper and lower fixing holes 421, 521. When the middle fixing hole 523 is caused to align with the first upper and lower fixing holes 421, 521 by a fastening element (not shown in FIGS. 5A-5C) extended through these holes into a wall, the narrowed protruded front end 530*a* of the lower extending element 530 is moved out of the bead chain guide way formed from the upper and the lower guide way 411, 511. The second upper fixing hole 431 is larger than and aligned with the second lower fixing hole 531. When another fastening element (not shown in FIGS. 5A to 5C) is sequentially extended through the second upper fixing hole 431 and the second lower fixing hole 531 into a wall, the narrowed protruded front end 580*a* of the pressing element 580 is held down by the fastening element to thereby move out of the bead chain guide way formed from the upper and the lower guide way 411, 511.

Figure 6A:
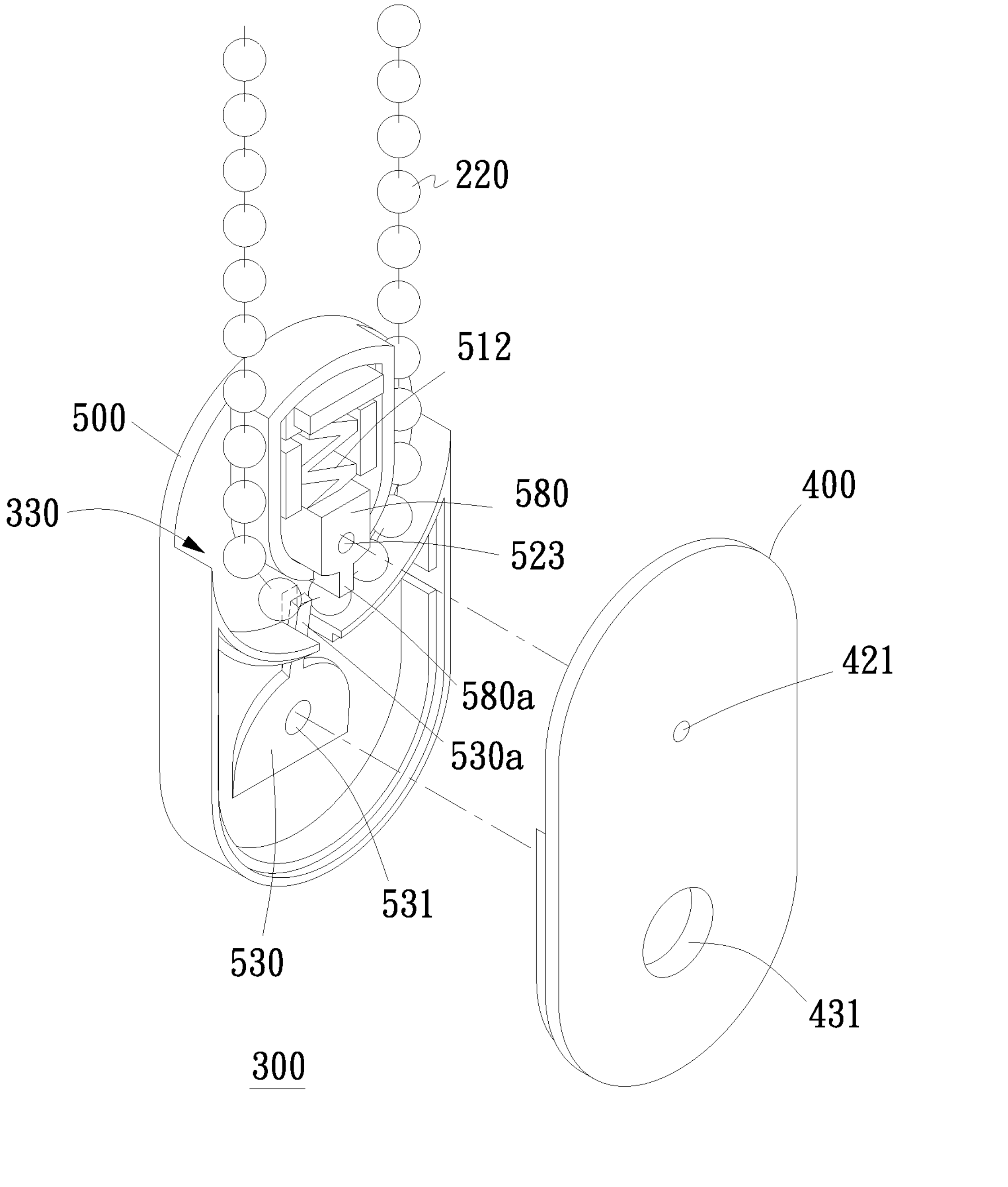
FIG. 6A is an exploded perspective view showing the curtain bead chain fixing device according to the second embodiment of the present invention interfering with a curtain bead chain extended therethrough before being adequately mounted to a wall surface.
Figure 6B:
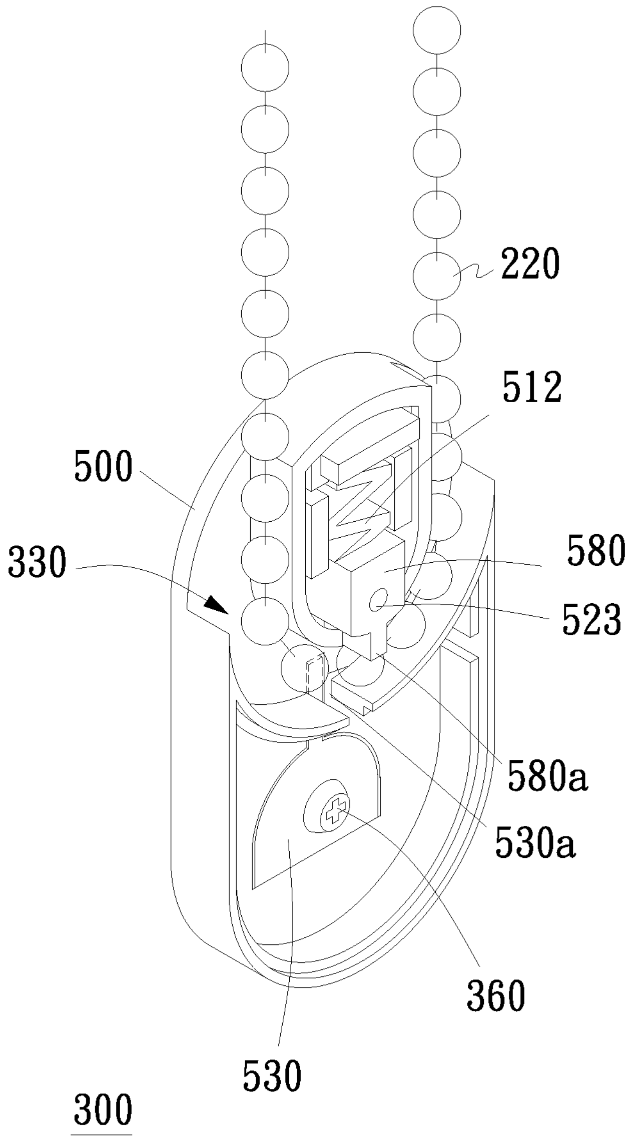
FIG. 6B shows the curtain bead chain fixing device of FIG. 6A has been adequately mounted to a wall surface and no longer interferes with the curtain bead chain extended therethrough.

Please refer to FIGS. 6A and 6B that are perspective views showing the use of the fixing device 300 according to the second embodiment with a bead chain 220. The upper case 400 and the lower case 500 can be assembled to each other through snap fitting or other fastening manners.

FIG. 6A shows the fixing device 300 before being adequately mounted to a wall surface using fastening elements. As shown, the narrowed protruded front end 580*a* of the pressing element 580 is elastically pushed by the elastic element 512 to extend into the bead chain guide way 330 formed from the upper and the lower guide way 411, 511 shown in FIGS. 5A and 5B, respectively. Meanwhile, the narrowed protruded front end 530*a* of the lower extending element 530 is also extended into the bead chain guide way 330. The narrowed protruded front ends 580*a*, 530*a* extended into the bead chain guide way 330 are set in a space between two adjacent beads of the bead chain 220 to interfere with the free movement of the bead chain 220 in and along the bead chain guide way 330. Preferably, the narrowed protruded front end 580*a* of the pressing element 580 and the narrowed protruded front end 530*a* of the lower extending element 530 are aligned with each other.

FIG. 6B shows the fixing device 300 having been adequately mounted to a wall surface using fastening elements 360. As shown, when the fixing device 300 has been adequately mounted to the wall surface via the fastening elements 360, the narrowed protruded front ends 580*a*, 530*a* are moved out of the bead chain guide way 330 and no longer interfere with the free movement of the bead chain 220 in and along the bead chain guide way 330. More specifically, the narrowed protruded front end 580*a* of the pressing element 580 is moved out of the bead chain guide way 330 because one of the fastening elements 360 is sequentially extended through the first upper fixing hole 421, the middle fixing hole 523 and the first lower fixing holes 521, so that the pressing element 580 is forced out of the bead chain guide way 330 and to compress the elastic element 512.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A curtain bead chain fixing device, comprising:

a bead chain guide way being extended across the fixing device for a bead chain serving as a pull cord for controlling a curtain to extend therethrough and become connected to the fixing device;

a first elastically movable interfering element being provided with a first fixing hole and arranged to one of two opposite sides of the bead chain guide way to elastically movably extend into the bead chain guide way; and a second elastically movable interfering element being provided with a second fixing hole and arranged to the other side of the bead chain guide way to elastically movably extend into the bead chain guide way;

wherein the first interfering element extended into the bead chain guide way interferes with the bead chain, such that the bead chain is prevented by the first interfering element from freely moving in and along the bead chain guide way; and wherein when the fixing device is adequately mounted to a wall surface with a fastening element extended through the first fixing hole, the first interfering element is forced out of bead chain guide way; and wherein the second interfering element extended into the bead chain guide way interferes with the bead chain, such that the bead chain is prevented by the second interfering element from freely moving in and along the bead chain guide way; and wherein when the fixing device is adequately mounted to a wall surface with a fastening element extended through the second fixing hole, the second interfering element is forced out of bead chain guide way.

2. The curtain bead chain fixing device as claimed in claim 1, wherein the first interfering element and the second interfering element are aligned with each other.

3. A curtain head chain fixing device comprising a first fixing zone, a second fixing zone, and a bead chain guide way formed form an upper guide way and a lower guide way; and the fixing device further comprising:

an upper case, on which the upper guide way is provided to divide the upper case into the first fixing zone and the second fixing zone; the upper case being provided in the first fixing zone with a first upper fixing hole, and in the second fixing zone with a second. upper fixing hole; and an upper pressing element passage being provided between the upper guide way and the first fixing zone of the upper case;

a lower case, on which the lower guide way is provided corresponding to the upper guide way to divide the lower case into the first fixing zone and the second fixing zone; the lower case being provided in the first fixing zone with a first lower fixing hole, and in. the second fixing zone with a second lower fixing hole; a lower pressing element passage being provided between the lower guide way and the first fixing zone of the lower case; and an lower extending element passage being provided between the lower guide way and the second fixing zone of the lower case; the lower case being further provided in the second fixing portion with a flexible and obliquely extended lower extending element, the lower extending element having a narrowed protruded front end normally extending through the lower extending element passage into the bead chain guide way; and a pressing element being arranged in the first fixing zone and pushed forward by an elastic element, of which an end is pressed against a side wall of the first fixing zone and another opposing end is pressed against a rear end. of the pressing element, such that a narrowed protruded front end of the pressing element is normally pushed by the elastic element into the bead chain guide way; and the pressing element being provided with a middle fixing hole;

wherein the narrowed protruded front ends of the pressing element and the lower extending element extended into the bead chain guide way interfere with a bead chain extended through the bead chain guide way, preventing the bead chain from freely moving in and along the bead chain guide way; and wherein the first upper fixing hole is corresponding to and aligned with the first lower fixing hole while offsetting from the middle fixing hole; whereby when the fixing device is adequately mounted to a wall surface with a fastening element extended through the first upper fixing hole, the middle fixing hole and the first lower fixing hole into the wall surface, the narrowed protruded front end of the lower extending element is forced out of the bead chain guide way; and wherein the second upper fixing hole is aligned with and larger than the second lower fixing hole, whereby when the fixing device is adequately mounted to a wall surface with a fastening element extended through the second upper and lower fixing holes into the wall surface, the narrowed protruded front end of the pressing element is forced out of the bead chain guide way.

4. The curtain bead chain fixing device as claimed in claim 3, wherein the narrowed protruded front end of the pressing element is aligned with the narrowed protruded front end of the lower extending element.

* * * * *